US010412700B2

(12) United States Patent
Swart

(10) Patent No.: US 10,412,700 B2
(45) Date of Patent: Sep. 10, 2019

(54) PORTABLE-DEVICE-LOCATING SYSTEM THAT USES ROOM-LEVEL MOTION SENSORS AND RSSI MEASUREMENTS TO DETERMINE PRECISE ROOM-LOCATION

(71) Applicant: Infinite Leap Holdings, LLC, Fargo, ND (US)

(72) Inventor: John A. Swart, Grand Rapids, MI (US)

(73) Assignee: Infinite Leap Holdings, LLC, Fargo, ND (US)

( * ) Notice: Subject to any disclaimer, the term of this patent is extended or adjusted under 35 U.S.C. 154(b) by 0 days.

(21) Appl. No.: 16/214,979

(22) Filed: Dec. 10, 2018

(65) Prior Publication Data

US 2019/0141663 A1 May 9, 2019

Related U.S. Application Data

(63) Continuation-in-part of application No. 16/010,747, filed on Jun. 18, 2018, now Pat. No. 10,251,020.
(Continued)

(51) Int. Cl.
*H04W 24/00* (2009.01)
*H04W 64/00* (2009.01)
(Continued)

(52) U.S. Cl.
CPC .......... *H04W 64/003* (2013.01); *G01S 11/06* (2013.01); *H04B 17/27* (2015.01); *H04B 17/318* (2015.01);
(Continued)

(58) Field of Classification Search
CPC ....... H04W 4/02; H04W 44/80; H04W 8/005; H04W 88/02; H04W 64/00; H04W 8/245; G08B 13/2462; H04M 1/72519; H04M 1/72522; H04L 29/08657; G06K 7/0008; G06K 19/0723
(Continued)

(56) References Cited

U.S. PATENT DOCUMENTS 9,810,767 B1 11/2017 Hamilton
2003/0197612 A1 10/2003 Tanaka
(Continued)

*Primary Examiner* — Danh C Le
(74) *Attorney, Agent, or Firm* — Frank M. Scutch, III

(57) ABSTRACT

A portable-device real-time locating system (RTLS) having portable devices and in-room radio-transmitting beacons. To determine which room a portable device is in, beacons broadcast radio transmissions containing motion-status information about recent history of perceived motion in a room as determined from a motion sensor in the beacon. Portable devices calculate received signal strength indications (RSSI) from nearby beacons, motion-in-room status sensed and reported by those beacons, plus their own motion status based on a portable-device-based accelerometer. A series of portable-device steps estimates the room-location of the portable based on a combination of RSSI analysis, and a comparison of portable-device-motion history to the perceived and recorded motion-status in a room. The analysis of portable-device-motion history and motion-in-room status produces a better estimate of room-level location of the portable device than an RSSI estimate can produce alone.

10 Claims, 5 Drawing Sheets

Related U.S. Application Data which is a continuation-in-part of application No. 15/610,072, filed on May 31, 2017, now Pat. No. 10,028,105.

(60) Provisional application No. 62/343,242, filed on May 31, 2016.

(51) Int. Cl.
| | |
|---|---|
| *H04W 4/029* | (2018.01) |
| *H04B 17/318* | (2015.01) |
| *H04W 4/02* | (2018.01) |
| *G01S 11/06* | (2006.01) |
| *H04M 1/725* | (2006.01) |
| *H04B 17/27* | (2015.01) |
| *H04W 4/33* | (2018.01) |
| *H04W 4/90* | (2018.01) |
| *H04W 52/24* | (2009.01) |
| *H04W 52/28* | (2009.01) |

(52) U.S. Cl.
CPC ........... *H04M 1/7253* (2013.01); *H04W 4/02* (2013.01); *H04W 4/023* (2013.01); *H04W 4/027* (2013.01); *H04W 4/029* (2018.02); H04M 1/72569 (2013.01); H04M 1/72572 (2013.01); *H04W 4/33* (2018.02); *H04W 4/90* (2018.02); *H04W 52/245* (2013.01); *H04W 52/285* (2013.01)

(58) Field of Classification Search
USPC ................................ 455/456.2, 456.5, 550.1
See application file for complete search history.

(56) References Cited

U.S. PATENT DOCUMENTS

| | | |
|---|---|---|
| 2007/0046434 A1 | 3/2007 | Chakraborty |
| 2007/0247366 A1* | 10/2007 | Smith ..................... G01S 5/021 |
| | | 342/464 |
| 2008/0172271 A1 | 7/2008 | Wee |
| 2010/0280874 A1 | 11/2010 | Thorn |
| 2010/0328073 A1 | 12/2010 | Nikitin |
| 2011/0072132 A1 | 3/2011 | Shafer |
| 2011/0080267 A1 | 4/2011 | Clare |
| 2013/0141233 A1 | 6/2013 | Jacobs |
| 2013/0201003 A1 | 8/2013 | Sabesan |
| 2013/0231775 A1 | 9/2013 | Jefferies |
| 2014/0197926 A1 | 7/2014 | Nikitin |
| 2014/0351498 A1 | 11/2014 | Hsueh |
| 2015/0063472 A1 | 3/2015 | Chatterton |
| 2015/0269818 A1 | 9/2015 | Jain |
| 2015/0286852 A1* | 10/2015 | Sengstaken, Jr. ........ A61J 1/035 |
| | | 340/10.1 |
| 2015/0371068 A1 | 12/2015 | Sandell |
| 2016/0029160 A1* | 1/2016 | Theurer ................... H04W 4/02 |
| | | 455/456.1 |
| 2016/0029176 A1* | 1/2016 | Marti .................... H04W 4/029 |
| | | 455/456.3 |
| 2016/0267144 A1* | 9/2016 | Manimaran ............. G06F 16/29 |
| 2016/0295358 A1 | 10/2016 | Cariss |
| 2016/0295376 A1 | 10/2016 | Geng et al. |
| 2016/0299213 A1* | 10/2016 | Jones ........................ G01S 5/08 |
| 2017/0127128 A1* | 5/2017 | Seger ............... H04N 21/44213 |
| 2017/0142549 A1 | 5/2017 | Herbert |
| 2017/0195834 A1* | 7/2017 | Na .......................... G01S 5/0252 |
| 2017/0313426 A1 | 11/2017 | Morin |
| 2018/0273344 A1* | 9/2018 | Mason .................. B66B 5/0031 |

\* cited by examiner

PORTABLE-DEVICE-LOCATING SYSTEM THAT USES ROOM-LEVEL MOTION SENSORS AND RSSI MEASUREMENTS TO DETERMINE PRECISE ROOM-LOCATION

FIELD OF THE INVENTION

The present invention relates generally to a portable-device indoor-locating system having stationary beacons, which advertise an identification code, so portable devices can determine their location within a building. The present invention proposes a novel use of motion sensors in the stationary beacons, to assist the portable device in determining precisely which room the portable device has entered, upon room-entry.

BACKGROUND OF THE INVENTION

Indoor-locating systems, in general, use sensors to locate the real-time position of a device, within a building. The devices may be asset tags, personnel badges, or portable devices. Those skilled in the art will recognize that portable device means a portable computing device such as a mobile telephone, smartphone, tablet or laptop computer. Some indoor-locating systems are indoor-wayfinding systems. Indoor-wayfinding systems that run as applications on portable devices provide guidance to people who are moving around within a building. Much as the Global Positioning System (GPS) provides location information to portable devices which are outdoors, and much like mapping systems provide suggested routes for navigating to a destination outdoors, an indoor-wayfinding system can provide location and route information within a building.

GPS satellites can provide a position estimate outdoors, but GPS satellites are not typically strong enough to provide a position estimate indoors. Therefore, owners of public buildings have been deploying "beacon" networks indoors, to provide location reference points. These "beaconing" location-reference points typically send out a radio message to portable devices such as mobile phones. The phones, when running an application, listen for the radio beacons, and run an algorithm to estimate their location in the building. The application can then use the location information and its mapping logic to suggest routes to destinations within the building.

One typical site for use of the indoor-wayfinding beacons and mobile-phone applications is hospitals. Patients and families of patients enter a hospital with a specific destination in mind. They may carry a portable device such as a mobile phone. The hospital wants to help patients to find caregivers, departments, and resources within the hospital, to improve their patient experience, and to assure that patients can arrive at their appointments on schedule. The hospital wants to help patients' family members navigate to find their loved ones. Hospitals may be well-signed with navigation signs, but the patients and family members may prefer the help of a phone-based wayfinding application which can show them a constant blue-dot on a map to verify their current location in the hospital, and they may prefer the help of a wayfinding application to provide them turn-by-turn directions.

Patient wayfinding systems in hospitals are mature. But typically the wayfinding system in a hospital provides a location estimate, not a precise room-level read. The location estimate is frequently based strictly on radio signals, which suffer from transmission impairments (blockage, reflection, absorption, interference) and travel through walls, so the mobile phone cannot determine from just the radio signals alone, which room it has entered.

This lack of room-level specificity means that traditional wayfinding systems are not accurate enough, in their location reports, to support use cases that require room-level accuracy. For example, some use cases need to know with 100% certainty that a doctor has entered room 601 rather than room 602. Assume the doctor is carrying a phone, and the phone has a locating or wayfinding application. The locating and wayfinding system that uses just radio signal strength will struggle to report which room the doctor has entered with the desired accuracy.

Use of a second technology is required to determine with near 100% accuracy which room the doctor's phone has entered. The current invention proposes the use of a room-level motion sensor in each patient room of the hospital. One room-level motion sensor in room 601 can sense whether a person has just entered room 601. A second room-level motion sensor in room 602 can sense whether a person has entered room 602. The phone and wayfinding app may be somewhat confused about which room it has entered based solely on radio signals, but the motion-sensing beacons' information will supplement any radio signal-strength indication (RSSI). Fusing together motion and RSSI information will give a better location estimate than RSSI can provide by itself.

Another potential solution to the 100% room-level-accuracy challenge are Real Time Location Systems (RTLS). Some RTLS systems can provide room-level accuracy to some devices in rooms, but most RTLS systems struggle to provide room-level accuracy to phones without adding an exterior tag to the phone.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
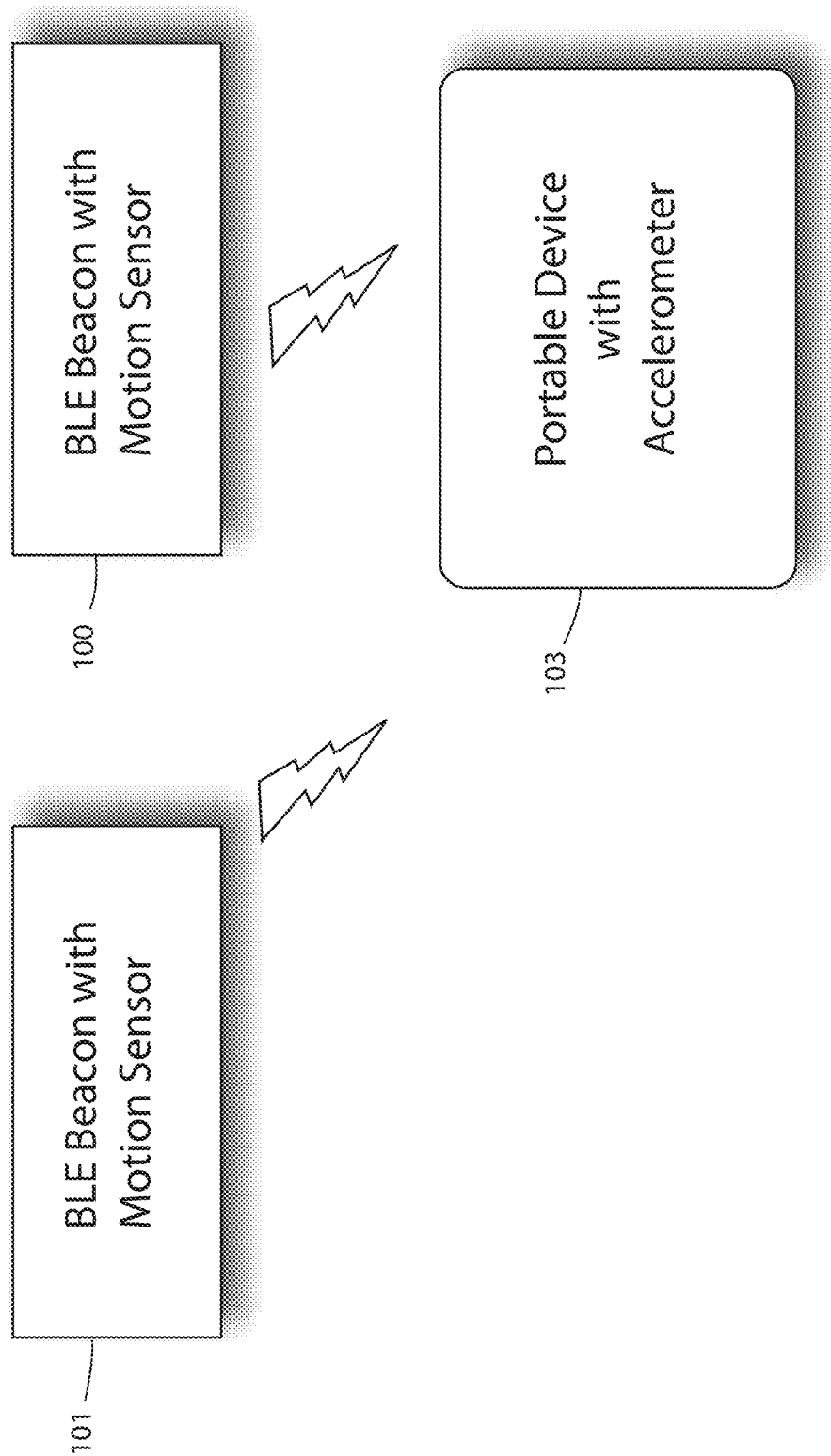
FIG. 1 is a block diagram illustrating components in a locating system that provides room-level accuracy for portable devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a locating system that uses beacons with motion sensors and a portable device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of locating systems having portable devices, and beacons. The non-processor circuits may include, but are not limited to, a radio receiver, a radio transmitter, signal drivers, clock circuits, power source circuits, and user input devices. As such, these functions may be interpreted as steps of a method to perform tag functions, bridge portable-device functions, and beacon functions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a block diagram illustrating components used in the portable-device locating system in accordance with various embodiments of the invention. The system 100 includes one or more fixed (in-room) beacon transmitters 101 that operate using a radio transmission on one to three (1-3) channels, that, amongst other things, contain a report of recent history of motion-status readings, as determined by a motion sensor in the beacon. The recent history of motion status reported in the transmission is at least one bit that toggles to represent "I see motion at my location" (in my room) or "I see no motion (in my room)", or alternatively may be several digital bits of data to include a description of how much motion is detected. The recent history of motion status readings may also include time-stamped indicators of recent motion-state transitions, from state-of-motion-to-state-of-no-motion or from state-of-no-motion-to-state-of-motion. The transmission is received by one or more portable devices 103. One or more portable devices 103 process the beacon transmissions, including the motion status reported by the beacons, by comparing the motion status of beacons (and rooms), to the portable device's own motion status, as determined by an on-board accelerometer. The portable device 103 may compare just the current motion status of its accelerometer to the current motion status of the beacons it hears, or the portable device may compare longer-term patterns of accelerometer-sensed-motion status to longer-term patterns of the motion status reported by the beacons. After some analysis of the portable device's received beacon transmissions, and an analysis of the contents of those beacon signals, the portable device may estimate its likely room-location. This estimation is determined using an algorithm or other means based on the invention as described herein.

Thus, the system in FIG. 1 includes a novel feature not taught in the prior art namely; a system of beacons and portable devices, which enables the devices to combine two factors to determine their room-location: one factor based on received signal strength, and a second factor based on motion status of portable devices and motion reports of in-room beacons. An advantage of the present invention is that the phone and professional e.g. doctor do not need an RTLS tag to achieve room-level location accuracy.

Figure 2:
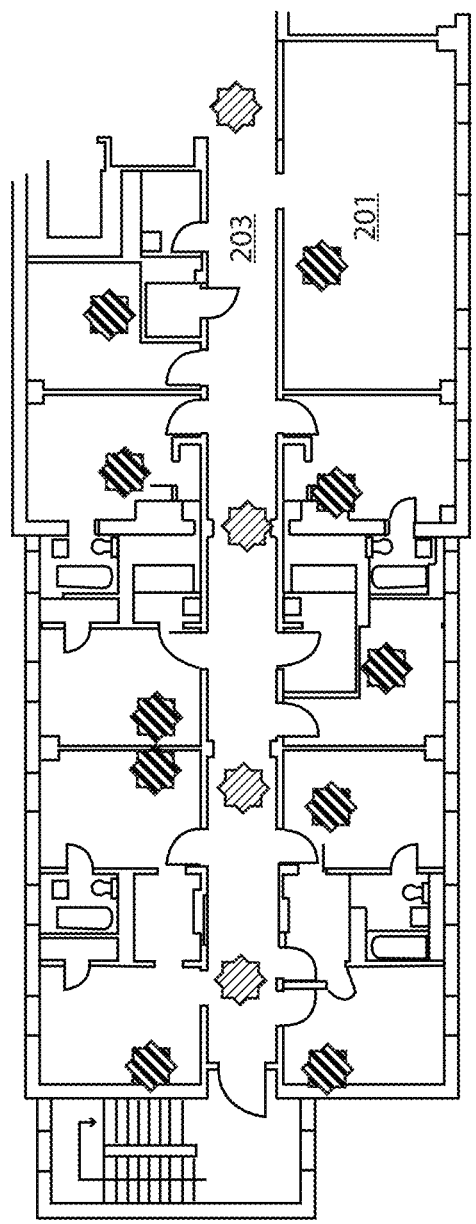
FIG. 2 is an sample indoor map, illustrating beacon components deployed as room-level infrastructure.

FIG. 2 is an illustration showing a map of a floor plan inside a building where room-level location of portable devices is required, such as a hospital. The floor plan 200 shows motion-sensing beacons 201 placed in each room where room-level locating is required, such as the patient rooms. The motion-sensing beacons are placed in each room, in a specific location, where they will see all human-walking motion that occurs in the room, and ideally, they will see very little human-walking motion outside the room. Those skilled in the art will recognize that "human-walking motion" is the typical movement of human beings traversing about a room whose velocity/speed might vary in a range from two miles per hour (2-mph) to approximately four miles per hour (4-mph). The floor plan 200 also shows motion-sensing beacons 203 placed in hallways outside where the room-level locating is required. In all embodiments of the current invention, the motion-sensing beacons include information such as a "report", in their radio transmissions, of whether there is motion detected in the room at the time of the radio transmission.

In some embodiments of the current invention, the motion-sensing beacon includes in its radio transmission, a history of past observations of motion in its room location. This information may be used by the portable device to match patterns of human-walking motion in the portable device (as observed in the mobile device's accelerometer) with patterns of human-walking motion as observed in the rooms (as observed in the beacon's motion sensor) to provide further room-level accuracy.

In some embodiments of the current invention, the motion sensing beacons may include in their radio transmission a statement or declaration of whether they are positioned inside a room where room-location is desired, vis-à-vis outside those rooms in a hallway. This information may be used by the portable device to determine that a portable device has left a hallway and is entering a patient room, further enhancing accuracy.

Figure 3:
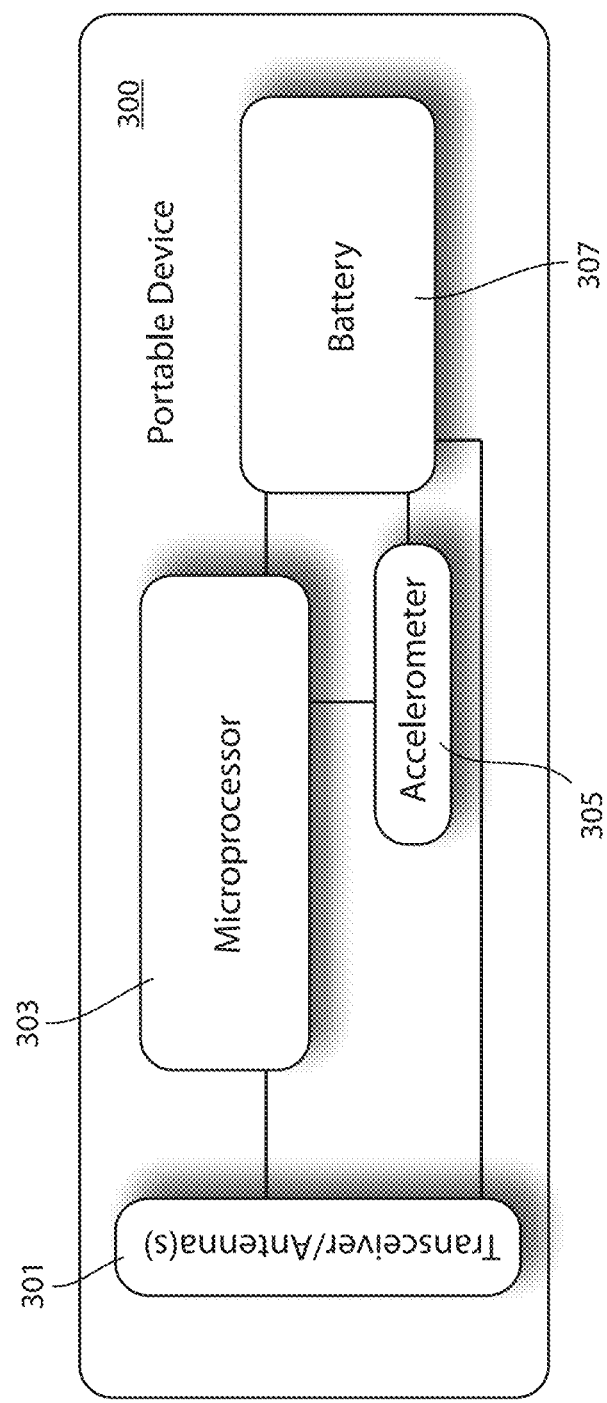
FIG. 3 is a block diagram illustrating minimally necessary components of the portable device.

FIG. 3 is a block diagram illustrating components used in the portable device as seen in FIG. 1. The portable device 300 includes a radio transceiver 301 that connects to a microprocessor 303 for controlling operation of the transceiver 301. Those skilled in the art will recognize that the radio transceiver may operate in differing frequency ranges.

An accelerometer 305 also connects to the processor 303 for informing the processor when the portable device is moving at human-walking speed as described herein. A battery 307 is connected to the BLE transceiver 301, microprocessor 303 and the accelerometer 305 for powering these devices.

Figure 4:
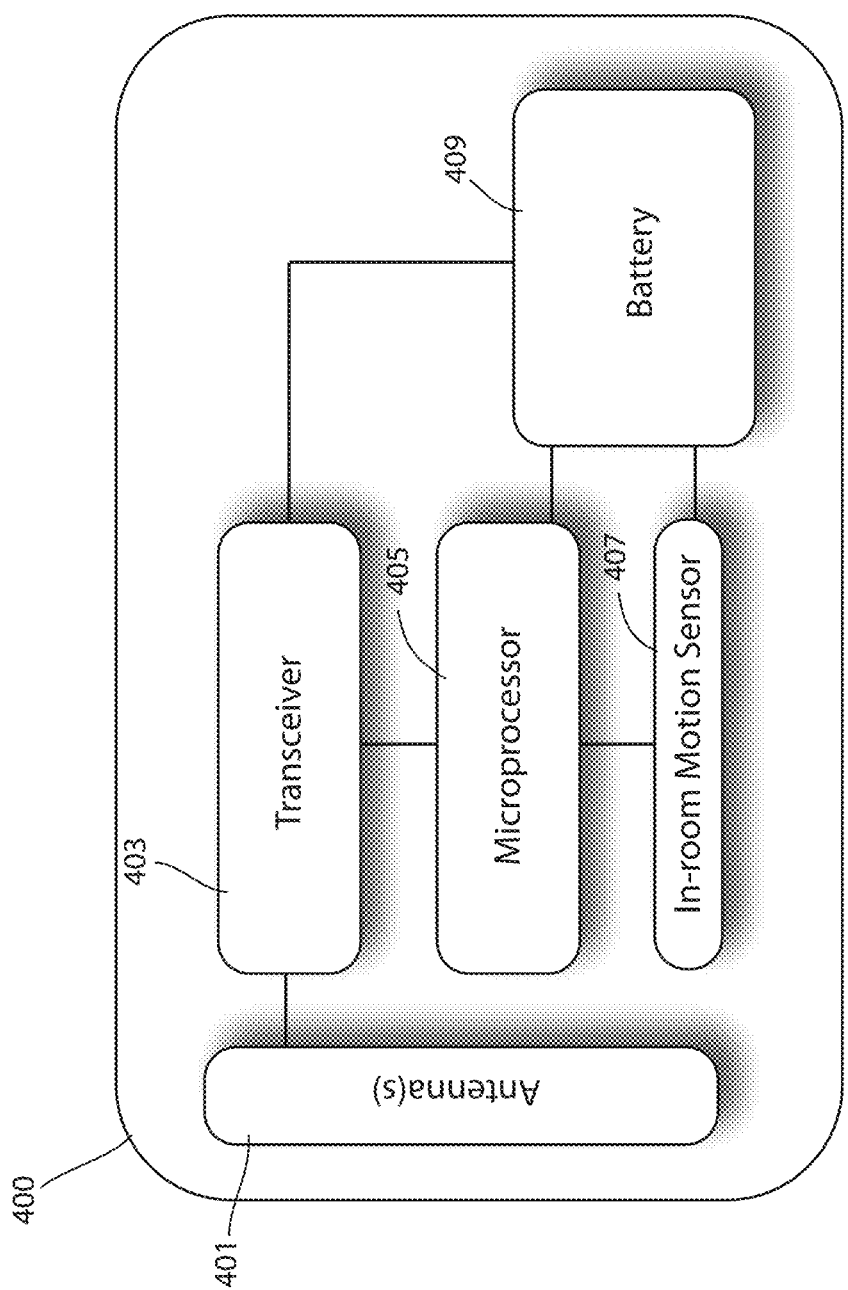
FIG. 4 is a block diagram illustrating components used in the beacon with an included motion sensor.

FIG. 4 is a block diagram illustrating components used in the beacon that uses motion sensing. The beacon 400 includes components for transmitting radio transmissions and includes one or more transceivers 403 that connect to a microprocessor 405 for controlling the transceiver(s). A battery 409 connects to the transceiver(s) 403 and the microprocessor 405 for powering these devices. As described herein, the beacon 400 typically is placed in the ceiling of a room so that portable devices can easily receive the beacon signal from the transceiver 403 when the portable devices s are moved between locations, e.g. between rooms. The beacon 400 includes one or more antennas 401 for providing gain. The beacon includes an in-room motion sensor 407, such as a Passive-Infrared sensor, which detects human motion in the room where the beacon is located, by tracking changes in the infrared radiation in the room. The motion sensor 407 is connected to both the microprocessor 405 and battery 409, for detecting motion of any object within its room and/or proximity location. Thus, the motion sensor 407 can determine if there is human motion moving about it, to assist a portable device. This information will also be included in its radio transmission.

Further, the portable device can correlate the motion status of rooms, to motion patterns of its own accelerometer, and prefer location-estimation for rooms that are reported to have coincident motion. If the radio signals by themselves are not conclusive enough for the portable device to determine which room it is in, the motion information contained in the radio transmissions will assist in adding room-level precision.

Figure 5:
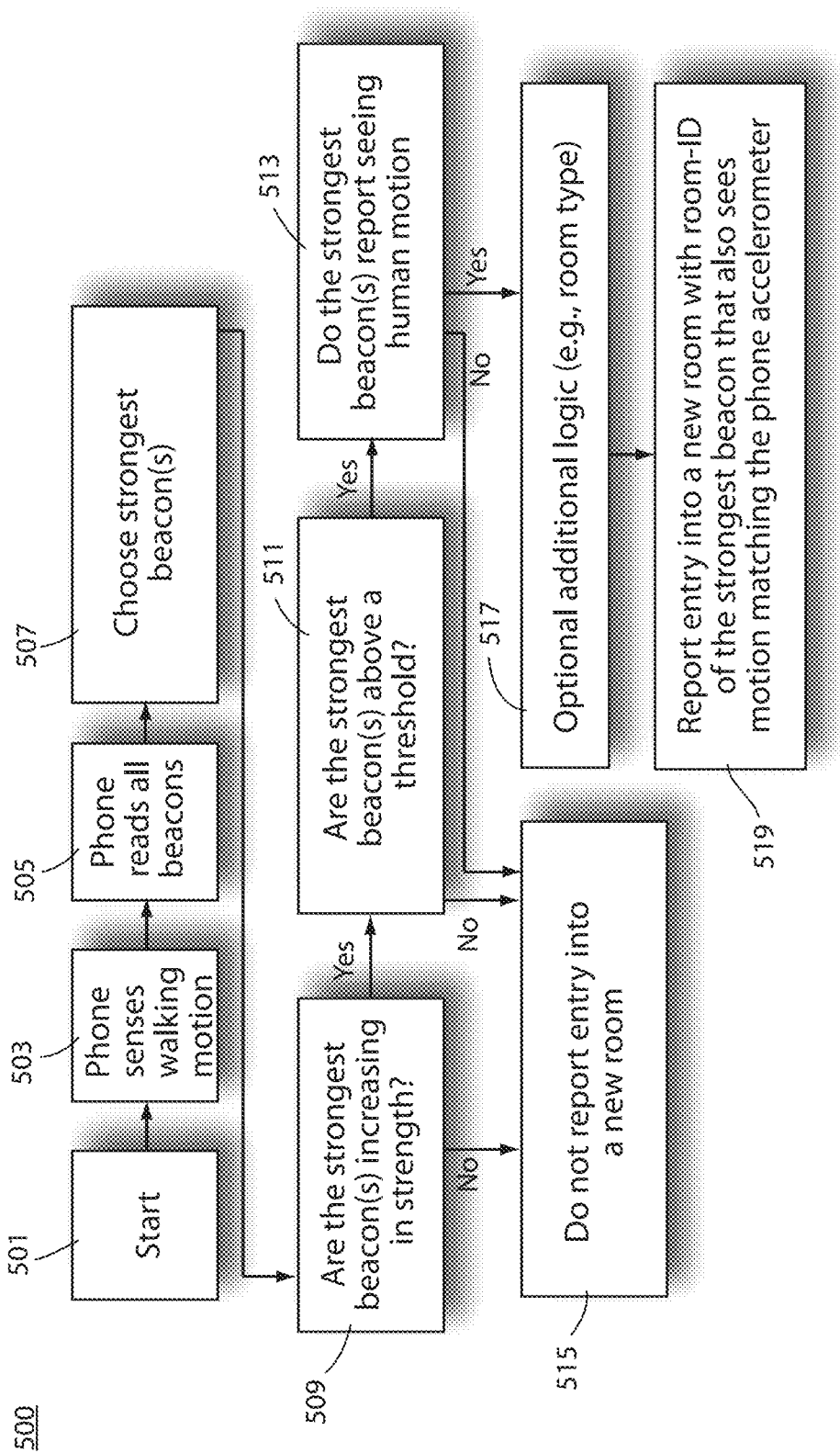
FIG. 5 is a flow chart diagram illustrating the steps executed in the portable device that lead to a room-level location fix for determining location.

FIG. 5 is a block diagram illustrating the location-estimation process. The method(s) 500 as shown in FIG. 5 include starting the process 501 where a portable device senses motion 503. The portable device will determine which beacon signals it receives 505 and the portable device will perform an analysis where it will identify the strongest beacons 507. The portable device may consider just a single, current signal strength report that it receives, or it may consider a longer-term pattern of signal-strength reports that it receives. The portable device will then consider whether it is entering the room with the strongest beacon by determining if the strength of the strongest beacon is increasing over time 509. If not, the portable device will withhold from sending a location update 515. The portable device will then consider whether the increasing-strength beacon has exceeded a sufficient threshold 511. If not, the portable device will withhold from sending a location update 515.

The portable device will then consider whether that strongest beacon it is approaching is reporting that it sees human motion in its radio transmission 513. If not, the portable device will withhold from sending a location update 515. The portable device may then optionally consider other information in its logic, for example, determining from the information in various beacons' transmissions that the portable device has moved away from hallway beacons and toward an in-room beacon 517. Based on the entire set of information available to it, including the motion status of the accelerometer, the motion status reported by surrounding beacons, the signal strength of surrounding beacons, the portable device estimates its room location with high accuracy 519.

In the prior art, radio signals sent by a beacon to the portable device will suffer from a variety of polarity fades (mismatches between the polarity of the transmitting antenna on the beacon and the receive antenna on the portable device), interference, blockages, absorption, and reflection. These effects work to dispel the general assumption that the RSSI of the radio transmission from the beacon to the portable device is directly correlated to the distance between the beacon and the portable device. Therefore, this adds error to the location estimate, mis-estimating which room a portable device has entered. All of these radio-fading effects are time-varying, as people and metal objects move through the hospital's rooms, so using radio signal strength alone to estimate the location of a portable device will make a portable device mis-estimate its location from time to time.

Various embodiments of the present invention use motion sensors to help determine which room a portable device has entered. Motion sensors have a relative advantage in that they perceive the motion inside a room, but they are shielded (by the wall) from sensing any motion in any adjacent room. In using the system and methods of present invention, the beacon has a motion sensor including but not limited to a passive infrared (IR) sensor, microwave sensor, area reflective sensor, ultrasonic and vibration sensors. Each motion sensor can detect motion of people inside its room, or detect lack of motion, and perhaps detect the difference between limited motion (like a patient sitting in a chair) and walking motion. Neither motion sensor can sense any motion on the opposite side of a wall.

Moreover, in the present invention, each beacon in each room sends a regular radio transmission. When the beacon senses no motion in its room, it includes that "no-motion" status data in its transmission. When the beacon senses motion in its room, it includes that motion-sensor reading in its transmission. The motion-sense-status that the beacon reads in the room may have more than two states: The states may be "no motion", "the motion of a patient sitting in a bed or chair", and "the motion of a human walking in a room". The beacon therefore broadcasts (in its transmission) its motion-sense-status as more like a patient sitting in a bed, or more like a human walking through the room, for further accuracy of portable-device location fixes. Since motion-status changes in one room are likely to be non-coincident with motion-status changes in an adjacent room, each room will have a unique "motion fingerprint" for its last few minutes of observed time. When a listening portable device hears multiple beacons and wants to estimate which room it is in, it will evaluate the received signal strength of the beacon transmissions. Additionally, embodiments of the present invention, will estimate its room-location based on the coincident timing of its own changes in motion, and the timing of reported changes in motion from the neighboring beacons. The motion-sensing data is room-specific, enabling a room-level location fix, even for portable devices that are close to a neighboring room or suffering from interference.

In the system and methods described herein, each portable device contains an accelerometer. The portable device always knows when it is moving, when it is not moving, and when it transitions from movement to stopped, with some sense of the pace of movement. So the portable device will estimate its room location, by favoring beacons (and therefore rooms) whose motion status matches the portable device's motion.

In one embodiment of the invention, each beacon may include in its transmission another piece of data, viz. its room-type. The beacon's transmission of its room-type helps the portable device to determine whether it is entering a room where room-level location is important (such as a patient room), vis-à-vis entering a hallway. For example, typical "room types" in a hospital setting may include but are not limited to patient room, hallway, equipment storage room, and elevator lobby. The portable device may optionally consider the room-type in its decision as to whether to report a room-level location.

Each beacon may include in its transmission another piece of data e.g. the floor on which it has been installed. A portable device knows that a movement from a patient room on one floor directly to a patient room on an adjacent floor is not likely (and a radio algorithm that reports such a change may be mistaken because of a spurious radio signal from another floor). Therefore, the portable device will be told to reject an apparent floor-hop from a patient room to another floor, because that move is unlikely. But a transition from a hallway on one floor to a patient room on the same floor is very possible, so the portable device should accept that reported location change when it is confirmed by the signal strength and motion-sensing algorithm. Hence, the portable device in the current invention uses both beacon-sensed-and-reported human-motion information, and radio signal strength, to estimate the location of a portable device. The location estimate will be more accurate over the portable device using radio signal strength alone.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A location system for estimating the room-location of a portable device in a building, comprising:
    at least one beacon equipped with a motion sensor for transmitting a radio transmission that includes recent history of motion status sensed in a beacon's room-location;
    at least one portable device for receiving radio transmissions from the at least one beacon and measuring multiple characteristics of the received transmissions, including received signal strength indication (RSSI) and a motion status of the beacon's room-location,
    where the portable device estimates its own location using all of current signal strength readings, past signal strength readings, patterns of accelerometer-sensed-motion status of the portable device are compared to and patterns of the motion status in the beacon's radio transmissions.

2. The location system as in claim 1, wherein the at least one beacon comprising:
    a radio transceiver;
    a microprocessor for operating the transceiver;
    a motion sensor for detecting motion in the beacon's room;
    a battery for powering the transceiver and the microprocessor; and
    at least one antenna for broadcasting the radio transmission from the transceiver to portable devices in proximity to the beacon.

3. The location system as in claim 1, wherein the at least one portable device estimates its own location further based upon beacon transmissions that include the room-type where the beacon is installed.

4. The location system as in claim 1, wherein the at least one portable device estimates its own location further based upon beacon transmissions that include the identified floor where the beacon is installed.

5. The location system as in claim 1, where the portable device is at least one of a mobile telephone, smartphone, tablet or laptop computer.

6. A location system for estimating the room-location of a portable device in a building, comprising:
    at least one BLE beacon equipped with a motion sensor for transmitting a radio transmission that includes motion status sensed in a beacon's room-location;
    at least one portable device for receiving BLE radio transmissions from the at least one beacon and measuring multiple characteristics of the received transmissions, including received signal strength indication (RSSI) and a motion status of the beacon's room-location; and
    where the portable device estimates its own room location uses all of past RSSI indications, current RSSI indications, motion status received in the beacon transmission, and accelerometer readings.

7. The location system as in claim 6, wherein the at least one beacon comprising:
    a BLE radio transceiver;
    a microprocessor for operating the transceiver;
    a motion sensor for detecting motion in the beacon's room;
    a battery for powering the transceiver and the microprocessor; and
    at least one antenna for broadcasting the radio transmission from the transceiver to portable devices in proximity to the beacon.

8. The location system as in claim 6, wherein the at least one portable device further estimates its own location based upon beacon transmissions that include the room-type where the beacon is installed.

9. The location system as in claim 6, wherein the at least one portable device further estimates its own location based upon beacon transmissions that include the identified floor where the beacon is installed.

10. The location system as in claim 6, where the portable device is at least one of a mobile telephone, smartphone, tablet or laptop computer.

* * * * *